(12) United States Patent
Hiltz-Laforge et al.

(10) Patent No.: US 10,019,497 B2
(45) Date of Patent: Jul. 10, 2018

(54) DATA MODEL AUGMENTATION

(71) Applicant: International Business Machines Corporation, Armonk, NY (US)

(72) Inventors: Jason Hiltz-Laforge, Ottawa (CA); Alireza Pourshahid, Ottawa (CA); Vinay N. Wadhwa, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 14/826,085

(22) Filed: Aug. 13, 2015

(65) Prior Publication Data

US 2017/0046410 A1    Feb. 16, 2017

(51) Int. Cl.
*G06F 17/00* (2006.01)
*G06F 17/30* (2006.01)

(52) U.S. Cl.
CPC .............. *G06F 17/30563* (2013.01)

(58) Field of Classification Search
CPC ..... G06F 17/30563; G06F 17/30; G06F 17/00
USPC .................................. 707/600–899
See application file for complete search history.

(56) References Cited

U.S. PATENT DOCUMENTS

| 7,475,080 | B2 | 1/2009 | Chowdbary et al. |
| 8,838,654 | B1 | 9/2014 | Hannah et al. |
| 2006/0265688 | A1* | 11/2006 | Carlson .................. G06F 8/36 717/101 |
| 2010/0049731 | A1 | 2/2010 | Kiran Vedula |
| 2014/0208292 | A1 | 7/2014 | Donis et al. |

* cited by examiner

*Primary Examiner* — Isaac M Woo
(74) *Attorney, Agent, or Firm* — Nicholas D. Bowman

(57) ABSTRACT

Techniques are described for data model augmentation. In one example, techniques include receiving a data contribution to a data model, receiving meta information about the data contribution, mapping the received data contribution and received meta information to the data model; and dynamically generating an augmentation of the data model based on the mapping.

20 Claims, 3 Drawing Sheets

DATA MODEL AUGMENTATION

TECHNICAL FIELD

The invention relates to business analytics and data management software.

BACKGROUND

Adding data to a model, whether it is for aggregation, analysis or decision-making purposes, is a frequent and popular operation in software systems. Some common examples of this include point of sale systems, where individual terminals contribute data which is aggregated into a larger whole and distributed budgeting and forecasting systems where line managers individually define local balance sheets which roll up to higher levels of an organization for executive discussions.

SUMMARY

In general, examples disclosed herein are directed to techniques for data model augmentation.

In one example, a computer-implemented method includes receiving a data contribution to a data model, receiving meta information about the data contribution, mapping the received data contribution and received meta information to the data model, and dynamically generating an augmentation of the data model based on the mapping.

The meta information may include time or location information for the data contribution. Dynamically generating an augmentation may include identifying data types for the meta information. The method further includes sending a report based on the augmented data model to a recipient. The recipient may include a point of sale system. The data contribution may include data for a supply chain management system. Mapping the received data contribution and received meta information may include building a database of patterns.

In another example, a computer system includes one or more processors, one or more computer-readable memories, and one or more computer-readable, tangible storage devices. The system further includes program instructions, stored on at least one of the one or more storage devices for execution by at least one of the one or more processors via at least one of the one or more memories, to receiving a data contribution to a data model. The system further includes program instructions, stored on at least one of the one or more storage devices for execution by at least one of the one or more processors via at least one of the one or more memories, to receive meta information about the data contribution. The system further include program instructions stored on at least one of the one or more storage devices for execution by at least one of the one or more processors via at least one of the one or more memories, to map the received data contribution and received meta information to the data model. The system further includes program instructions stored on at least one of the one or more storage devices for execution by at least one of the one or more processors via at least one of the one or more memories dynamically generate an augmentation of the data model based on the mapping.

In another example, a computer program product includes a computer-readable storage medium has program code embodied therewith. The program code is executable by a computing device to receive a data contribution to a data model, receive meta information about the data contribution, map the received data contribution and received meta information to the data model, and dynamically generate an augmentation of the data model based on the mapping.

DETAILED DESCRIPTION

Various examples are disclosed herein for dynamic data model augmentation. Instead of being constrained by the vision of the modeler, distributed contribution systems can have their data augmented and enhanced by information about the contributions themselves. This information could include temporal data, location based information, or any other type of meta information which can be captured by the contribution process itself which does not require explicit modeling.

Figure 1:
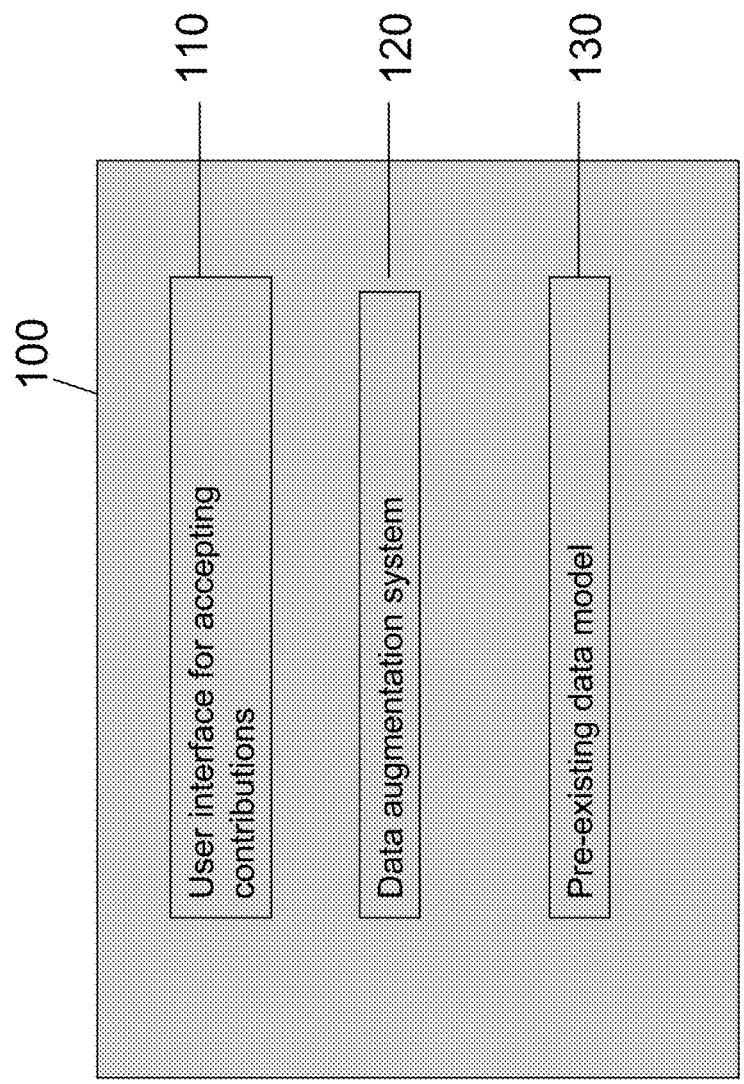
FIG. 1 is a block diagram illustrating a computing environment for data model augmentation.

FIG. 1 shows a block diagram of a system 100 for dynamic data model augmentation. The system includes a user interface 110 for accepting data contributions to the model, and capturing meta information about the contribution itself. The meta information may include time or location data.

The system includes a data augmentation system 120 configured to receive the contributed data and map it to a pre-existing data model 130. The system 120 may receive meta information about the contribution and map the received meta information to the pre-existing data model. The system 120 may generate new model artifacts dynamically.

Figure 2:
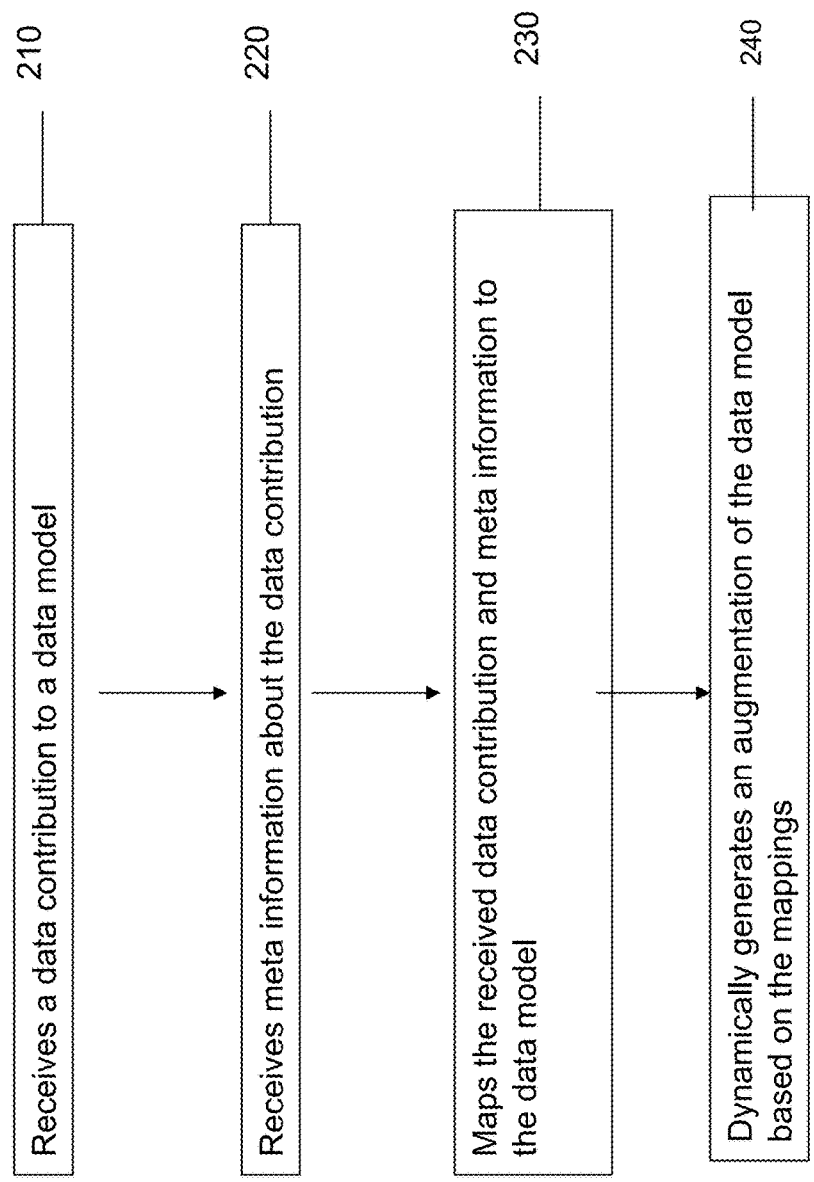
FIG. 2 is a flow diagram of a method for data model augmentation.

FIG. 2 is a flow diagram illustrating a method for dynamic data model augmentation. In one aspect, the method receives a data contribution to a pre-existing data model (step 210.) The method also receives meta information about the data contribution (step 220.) The meta information can include time or location information.

The method maps the received data contribution and received meta information to the pre-existing model. (step 230.) The method dynamically generates an augmentation of the data model based on the mapping (step 240.)

In one embodiment, the data model is implemented using OLAP (On-line Analytical Processing) and the dynamic generation to augment the data model is performed by applying OLAP update techniques.

The dynamic generation may employ cognitive approaches for model augmentation, including considering meta information data types and concepts for enhanced model augmentation. In one embodiment, as part of the mapping, a knowledge base is created. The knowledge base contains patterns that map to concepts that can be used to tag pieces of data describing what those pieces of data are. For example, a date/time pattern can be mapped to a date/time concept. Once the metadata is tagged or annotated, the concepts can be used to determine which pieces of metadata would be valuable to the update. For example, a timestamp may be deemed valuable whereas a checksum may not be.

As an illustrative non-comprehensive example, suppose that a grocery retailer with several different locations produces daily sales information to a central model. Each location has multiple point of sales which are aggregated together to produce the daily sales report for that particular location. This report is then uploaded daily to a central location, providing a daily view of the company's sales.

In the data model, the locations are identified by a branch number and the individual point of sales is numbered sequentially. So for example, one grocery may be identified as branch #26 and the register on a particular aisle is point of sale #3. Together, these two pieces of information identify every location where the retailer makes sales.

Suppose that the company's system was able to capture the following meta-information during the daily data contribution process: time, location of store and location of point of sale. The system would then add this information to the model, allowing new reports to be written and insights to be gained. Given that the system detects the information concepts and data types (i.e., location and time) information it creates a hierarchical dimension that maps each branch to its geographical location. Without the need for the modeler to have thought about it ahead of time, this data could be used to answer questions such as:

Which store is fastest from close of business to upload of daily data?
Which one is slowest?
Does the location of a point of sale inside a store have an effect on the amount of sales generated?
Is the point of sales being used evenly? Are there bottlenecks?
Which cities and states are doing better or worse?

In addition, information from outside the system could now be merged in and accessed. For example, if a large convention was in town, the location and time data could be used to see if the convention had a meaningful impact on sales.

Figure 3:
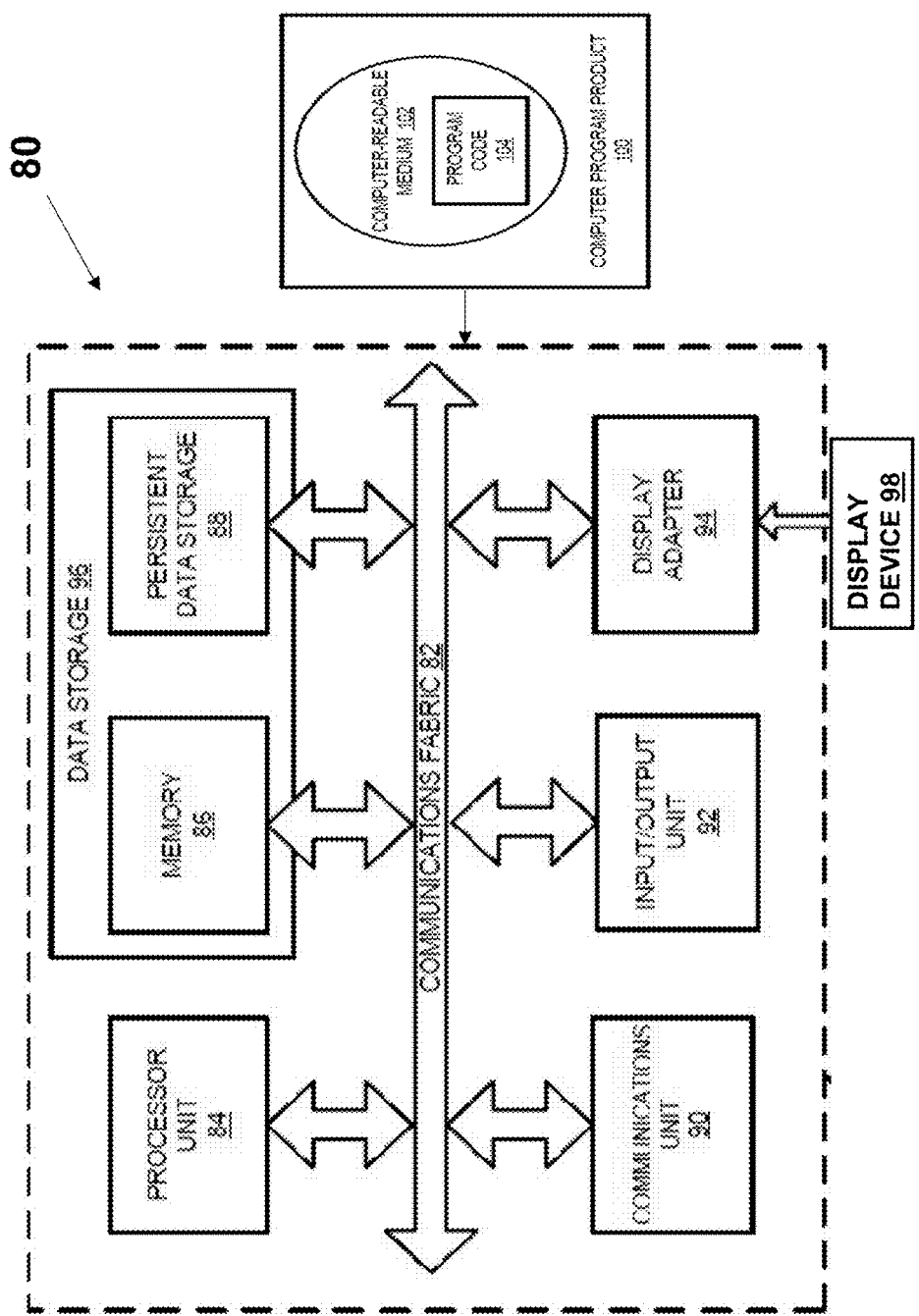
FIG. 3 is a block diagram of a computing device for data model augmentation.

FIG. 3 is a block diagram of a computing device 80 that may be used to execute an attention management program, according to an illustrative example. Computing device 80 may be a server such as a web server or application server. Computing device 80 may also be a virtual server that may be run from or incorporate any number of computing devices. A computing device may operate as all or part of a real or virtual server, and may be or incorporate a workstation, server, mainframe computer, notebook or laptop computer, desktop computer, tablet, smart phone, feature phone, or other programmable data processing apparatus of any kind. Other implementations of a computing device 80 may include a computer having capabilities or formats other than or beyond those described herein.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of IBM CONFIDENTIAL D-2 the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for data model augmentation, the method comprising:
receiving a data contribution to a data model;
receiving meta information that includes time and location information about the data contribution;
mapping the received data contribution and received meta information to the data model;
dynamically generating an augmentation, based on the mapping, of the data model, wherein generating the augmentation includes identifying data types for the meta information; and
sending, to a recipient, a report based on the augmented data model.

2. The method of claim 1, wherein the recipient is a point of sale system.

3. The method of claim 1, wherein the data contribution includes data for a supply chain management system.

4. The method of claim 1, wherein mapping the received data contribution and received meta information includes:
building a database of patterns.

5. The method of claim 4, wherein the patterns stored in the database are mapped to concepts, the method further comprising:
mapping patterns stored in the database of patterns to tags;
generating a set of tags for the data contribution using the patterns stored in the database of patterns, wherein the set of tags identify concepts in the data contribution; and
tagging the data contribution using the generated set of tags.

6. The method of claim 5, wherein receiving meta information about the data contribution includes:
determining, based on the tags, that one or more pieces of meta information about the data contribution are useful to update the data model;
extracting the one or more pieces of meta information from the data contribution; and
storing the one or more pieces of extracted meta information.

7. The method of claim 6, wherein the one or more pieces of meta information are used to dynamically generate the augmentation.

8. The method of claim 6, wherein the one or more useful pieces of meta information include the time and location information about the data contribution, and wherein mapping patterns stored in the database of patterns to tags includes:
identifying, from the database of patterns, a date/time pattern; and
mapping the date/time pattern to a date/time concept found in the meta information for the data contribution.

9. A computer system for data augmentation, the computer system comprising:
one or more processors, one or more computer-readable memories, and one or more computer-readable, tangible storage devices;
program instructions, stored on at least one of the one or more storage devices for execution by at least one of the one or more processors via at least one of the one or more memories, to receive a data contribution to a data model;
program instructions, stored on at least one of the one or more storage devices for execution by at least one of the one or more processors via at least one of the one or more memories, to receive meta information that includes time and location information about the data contribution;
program instructions, stored on at least one of the one or more storage devices for execution by at least one of the one or more processors via at least one of the one or more memories, to map the received data contribution and received meta information to the data model;
program instructions, stored on at least one of the one or more storage devices for execution by at least one of the one or more processors via at least one of the one or more memories, to dynamically generate an augmentation, based on the mapping, of the data model, wherein generating the augmentation includes identifying data types for the meta information; and
program instructions, stored on at least one of the one or more storage devices for execution by at least one of the one or more processors via at least one of the one or more memories, to send, to a recipient, a report based on the augmented data model.

10. The system of claim 9, wherein the recipient is a point of sale system.

11. The system of claim 9, wherein the data contribution includes data for a supply chain management system.

12. The system of claim 9, wherein program instructions to map the received data contribution and received meta information includes:
program instructions to build a database of patterns.

13. The system of claim 9, wherein the report based on the augmented data model is a daily sales report.

14. The system of claim 13, wherein the daily sales report includes data aggregated from multiple point of sale systems at a particular location.

15. A computer program product for modeling business intelligence data, the computer program product comprising a non-transitory computer-readable storage medium having program code embodied therewith, the program code executable by a computing device to:
receive a data contribution to a data model;
receive meta information that includes time and location information about the data contribution;
map the received data contribution and received information to the data model;
dynamically generate an augmentation, based on the mapping, of the data model, wherein generating the augmentation includes identifying data types for the meta information; and
send, to a recipient, a report based on the augmented data model.

16. The computer program product of claim 15, wherein the recipient is a point of sale system.

17. The computer program product of claim 15, wherein the data contribution includes data for a supply chain management system.

18. The computer program product of claim 15, wherein the program code executable to map the received data contribution and received meta information includes:
program code executable to build a database of patterns.

19. The computer program product of claim 15, wherein the report based on the augmented data model is a daily sales report.

20. The computer program product of claim 19, wherein the daily sales report includes data aggregated from multiple point of sale systems at a particular location.

* * * * *